United States Patent [19]

Monson

[11] 4,254,168

[45] Mar. 3, 1981

[54] CHIP-RESISTANT PIGMENTED POLYURETHANE PROTECTIVE COATING

[75] Inventor: Norman J. Monson, Saint Paul, Minn.

[73] Assignee: Minnesota Mining and Manufacturing Company, Saint Paul, Minn.

[21] Appl. No.: 61,404

[22] Filed: Jul. 27, 1979

[51] Int. Cl.$^3$ .................. C08L 61/20; C08L 61/26
[52] U.S. Cl. ............................ 427/409; 428/425.1; 428/424.4; 427/407.1; 260/40 TN
[58] Field of Search ................... 427/407 R, 409; 428/425, 423; 260/40 TN

[56] References Cited

U.S. PATENT DOCUMENTS

| | | | |
|---|---|---|---|
| 3,396,210 | 8/1968 | McKillip | 260/40 TN |
| 3,401,143 | 9/1968 | Finelli | 260/40 TN |
| 3,458,459 | 7/1969 | Wooster | 260/40 TN |
| 3,557,043 | 1/1971 | Knauss | 260/40 TN |
| 3,769,069 | 10/1973 | Sawyar | 428/425 |
| 3,871,911 | 3/1975 | Conacher | 428/425 |
| 3,962,522 | 6/1976 | Chang | 428/425 |
| 4,131,693 | 12/1978 | Wendt | 428/425 |

OTHER PUBLICATIONS

Polyurethanes, Part II, Saunders & Frisch, p. 344.

*Primary Examiner*—Sam Silverberg
*Attorney, Agent, or Firm*—Cruzan Alexander; Donald M. Sell; Richard Francis

[57] ABSTRACT

The invention is a method of coating a substrate with a chip-resistant polyurethane protective coating which contains pigmented acrylic lacquer, acrylic enamel or nitro-cellulose lacquer. This blend provides a coating composition which matches the colors of the existing pigmented protective surface of a substrate such as an automobile. The method involves supplying to a substrate a liquid curable primary amine-free polyurethane coating composition containing a catalyzed mixture of polyester polyol, polyisocyanate compound, and organic solvent, permitting the organic solvent to flash evaporate until the coating exhibits a tacky surface condition, and then applying sufficient uniform coats to cover the substrate with a mixture of the unpigmented polyurethane coating composition and a liquid pigmented protective coating composition selected from the group consisting of acrylic lacquer, acrylic enamel, and nitrocellulose reduced with compatible solvent for use.

4 Claims, No Drawings

CHIP-RESISTANT PIGMENTED POLYURETHANE PROTECTIVE COATING

BACKGROUND OF THE INVENTION

1. Field of the Invention

This invention relates to a novel method of coating a substrate with a chip-resistant nondiscoloring polyurethane protective coating containing pigmented acrylic lacquer, acrylic enamel, or nitrocellulose lacquer.

2. Background of the Prior Art

Notwithstanding a considerable portion of roadways being paved, both in the United States and in foreign countries, there exists a serious paint chipping problem which continues to plague motor vehicle owners, caused by gravel and other small particles on the road bed being thrown against the painted surfaces of such vehicles. The same problem plagues the owners of other painted structures such as boats, trailers, airplanes, trains, tanks, towers, and the like, although the impacting particles may be from other sources.

The chipping problem is perhaps most noted by the owners and manufacturers of automobiles, particularly those having the so-called European body style wherein the body of the automobile tends to curve inwardly immediately behind the front and/or rear wheels. This situation causes particles such as gravel from streets and other roadway surfaces to be carried on the surface of the tires and impacted against the painted surface of the automobile. Since the paved roadways typically have small gravel particles and other hard particles on their surface and unpaved roads usually always contain such material, the propelling of high speed particulate material against the painted surface of the automobile is unavoidable. While means have been suggested for imposing a shield such as a mud flap or mud guard between the automobile wheel and the painted surface, this solution has not been completely satisfactory because it detracts from the vehicle's aesthetic appearance and adds yet another cost to the already high price of the automobile.

Attempts have been made to produce tougher, more chip-resistant paint for automobiles, but these have not been generally completely satisfactory. Polyurethanes have been employed in paint compositions in an attempt to make the paints tougher and more durable, but there has been some difficulty in pigmenting the polyurethane protective coating to make it indistinguishable from existing paints already applied to the automobile. This presents a serious problem in automobiles since, because of its higher cost, polyurethanes are typically not employed to cover the entire surface to be painted. Rather, the chip-resistant coatings are cusotmarily added to those locations which would be more susceptible to chipping, e.g., on the automobile body immediately behind the wheels, the leading portion of the automobile such as the front of the hood and other front portions of the body.

Vinyl plastisols are being employed as chip-resistant coatings. The heat such coatings require for curing dictates their use before painting in the manufacturing plant virtually precluding their use in repair shops because such heating would damage existing painted surfaces. Such repair shops typically use a vinyl composition which air dries. Such coatings are also not particularly desirable because they are generally rough and inconsistently textured and difficult to repair. Additionally, a commercially available polyurethane enamel sold under the registered trademark "Imron" has been available as a chip-resistant protective coating, but it has only a moderate degree of chip-resistance and it is not recommended for blending with known pigmented lacquers or enamels.

U.S. Pat. No. 3,401,143 by Finelli and West discloses one example of a pigmented polyurethane protective coating which may be blended with commercial pigmented lacquers, such as acrylic resin, vinyl acrylic resin and nitrocellulose lacquers. But such polyurethane resins are not suited for use in a broad spectrum of commercial pigmented lacquers, including acrylic enamels, because of the presence of certain diamine catalysts. In fact, blends of such polyurethane and pigmented acrylic enamel produce a liquid composition which, when applied to a surface, dries to a rough unsightly finish.

Automobile repairmen and dealers desire a liquid composition which will provide an inconspicuous protective coating which is non-sagging and compatible with all of the more commonly used pigmented paints including acrylic enamels and other paints such as acrylic lacquer and nitrocellulose lacquer. The present invention provides such a composition.

SUMMARY OF THE PRESENT INVENTION

The present invention provides a novel method of coating a substrate with a chip-resistant polyurethane protective coating which may contain pigmented acrylic lacquer, acrylic enamel, or nitrocellulose lacquer. This blend provides a coating composition which matches the colors of the existing pigmented protective surface of a substrate such as an automobile body. Such compatibility is essential since the blend is normally applied only to those areas of the substrate where chipping would be expected to be a problem. The polyurethane coating composition is compatible with many readily available commercial liquid pigmented protective coating compositions typically found on the storage shelves of the user. The blend of the liquid pigmented protective coating with the polyurethane coating composition produces a pigmented protective coating which obscures subsequent impact marks such as may be caused by small projectiles impinging upon the surface, unlike an unpigmented polymeric coating over a pigmented coating which reveals light or white marks at the site of impact due to the surface fracturing of the clear polymeric coating.

The method of the invention involves applying to a substrate a liquid curable primary amine-free polyurethane coating composition containing a catalyzed mixture of polyester polyol, polyisocyanate compound, and organic solvent, permitting the organic solvent to flash evaporate until the coating exhibits a tacky surface condition between coats, and then applying sufficient uniform coats to cover the substrate of a mixture of the unpigmented polyurethane coating composition and a liquid pigmented protective coating composition selected from the group consisting of acrylic lacquer, acrylic enamel and nitrocellulose reduced with compatible solvent for use. Preferably, the polyurethane coating composition is applied unpigmented in at least three coats with a top coat of a blend of the pigmented coating composition with the polyurethane coating composition.

The primary amine-free polyurethane coating composition is curable to form a polyurethane having an elongation at break of at least about 75%, preferably at least about 100%. This composition is formed of a catalyzed mixture of polyester polyol and sufficient polyisocyanate compound to provide an NCO:OH ratio of about 2:1 to about 0.8:1. The polyester polyol preferably is characterized by having more than one terminal hydroxyl group and an equivalent weight between about 250 and about 1500, although other polyols outside this range may be useful provided the resultant polyurethane is not too soft or too brittle. The catalyst for the polyurethane is not of the primary amine type.

The polyisocyanate compound is characterized by having at least two terminal isocyanate groups each being attached to a non-benzenoid carbon atom. Sufficient compatible solvent is added to make a sprayable composition. For this purpose, the mixture should have a solids content of about 20% to about 70% by weight and a viscosity of about 20 to about 300 cps as determined by using a Brookfield RVF viscometer employing a No. 1 spindle rotated at 20 rpm at 25° C.

The polyurethane composition is mixed with liquid pigmented protective coating composition in a wet volume ratio of pigmented protective coating composition to polyurethane coating composition of about 2:1 to about 1:20. (By "wet volume ratio" is meant the ratio of the volume of polyurethane coating composition to the volume of diluted or reduced liquid pigmented protective coating composition which has been diluted or reduced for use according to the manufacturer's instructions.) The dried coating thickness of the blend of polyurethane coating composition and liquid pigmented protective coating composition is on the order of about 1 to about 20 mils.

DETAILED DESCRIPTION OF THE INVENTION

Polyester polyols useful in the present invention are prepared by the condensation reaction of a polycarboxylic acid or anhydride with a polyol. Representative carboxylic acids are the aliphatic dicarboxylic acids such as adipic, glutaric, suberic, sebacic and azelaic, and aromatic acids such as phthalic, terephthalic and isophthalic and the corresponding tri- and higher functionality carboxylic acids. Representative polyols are the glycols such as ethylene, propylene, butylene and higher, the triols such as glycerol, trimethylol propane and trimethylol ethane and the tetrols such as pentaerythritol and the hexols.

The useful organic polyisocyanates are those having all of the isocyanate groups attached to non-benzenoid carbon atoms. Exemplary useful isocyanates include m-xylylene diisocyanate, 4,4'-methylene-bis (2-isocyanatoethyl) furmarate-bis (2-ioscyanatoethyl) carbonate, bis (2-isocyanatoethyl)-4-cyclohexene, 1,2-dicarboxylate and hexamethylene diisocyanate, 1-methyl cyclohexyl-2, 4-diisocyanate, 1-methyl cyclohexyl-2, 6-diisocyanate, mixtures of 1-methyl-cyclohexyl-2,4-diisocyanate and 1-methyl cyclohexyl-2, 6-diisocyanate and 3 isocyanatomethyl 3, 5, 5-trimethyl cyclohexyl isocyanate (isophorone diisocyanate).

The polyurethane composition may be blended with any of a variety of known pigmented acrylic lacquers, acrylic enamels, or nitrocellulose lacquers. Examples of such pigmented coating materials include refinish acrylic enamels sold under the trade designations "Centari", optionally with hardener 792S by the DuPont Co., "Delstar", optionally with "Delthane" hardner, DXR-80 by Ditzler Division of PPG Industries, Inc., acrylic enamel by Acme Division of Sherwin Williams Co., optionally with "Kata-Kril" 899 hardner, acrylic lacquers sold under the trade designations "Lucite" by the DuPont Co., "Duracryl" by Ditzler, "Pro-Kril" by Acme and nitrocellulose lacquer sold under the trade designation "Duco" by the DuPont Co.

The solvents which may be added to the liquid compositions defined in the present invention are those hydrocarbon and oxygenated hydrocarbon solvents customarily added to conventional pigmented acrylic lacquers, acrylic enamels, or nitrocellulose lacquers, provided that such solvents are compatible with the polyisocyanate compositions defined herein. Examples of useful solvents include DuPont's 3661S and Acme's AE reducer 887.

In use, the unpigmented polyurethane coating composition defined above is applied to a previously prepared surface being protected. Such surface preparation may include cleaning with chemical comositions, abrading with abrasive articles such as abrasive wheels, sanding disks or sanding paper and other conventional surface preparation steps. The surface preferably is previously coated with a suitable rust-inhibiting priming composition. Optimum pigmentation is obtained when an initial coat of the pigmented protective coating composition is applied, prior to application of the initial polyurethane coat or coats and the final coat of a blend of the pigmented coating composition with the polyurethane coating composition. Preferably at least three coats of the unpigmented polyurethane coating composition are applied to the surface, with flash evaporation of the solvent permitted between coats to provide a tacky surface layer, typically about 10 minutes being elapsed between coats.

Thereafter, a blend of a polyurethane composition with conventional pigmented protective coating compositions is applied. The initial coat may also be pigmented, although it is not necessary since, as long as the unpigmented coat is top-coated with the pigmented blend, adequate color matching is provided. The blend of polyurethane coating composition with conventional pigmented protective coating composition is in a wet volume ratio of conventional pigmented coating composition to polyurethane coating composition of 2:1 to 1:20. At higher concentrations of pigmented coating compositions, the composition may not have the desirable high impact resistance. At lower concentrations of pigmented coating composition, the composition lacks sufficient pigment to obscure the undercoating.

The resultant coating applied by the method of this invention will be on the order of 1 to about 15 mils, preferably 7 to 12 mils, on a dry basis. If the coating is thicker than 15 mils, it may sag during application. Additionally, coatings thicker than 15 mils are generally not necessary and are therefore uneconomical. Additionally, such thick coatings are more prone to peeling than thinner coatings.

The catalyst selected for the polyurethane composition preferably provides a pot life of about 2 to 8 hours which is an adequate working time yet permits the coating to cure in a commercially acceptable period of time. As indicated above the diamine type catalysts are not acceptable because of their tendency to react with acrylic enamels. The preferred catalysts are organo zinc and tin salts such as dibutyltindilaurate, zinc octoate, and tertiary amines such as that available under the trade designation "Desmorapid PP" from Mobay Chemical Co. The catalysts are added in conventional amounts known to cause curing as is known to those skilled in the art.

The compositions of the present invention are liquid, having a viscosity and consistency which permits spraying with conventional spraying equipment as may be found for example in automobile body repair shops, paint shops, and the like. The compositions may also be applied by other coating techniques, for example, brush coating, roll coating, and by other known means.

EXAMPLES

The invention is illustrated by the following examples, wherein all parts are by weight, unless otherwise specified.

The ingredients specified in Examples 1-4 are identified and characterized below. It should be noted that Examples 1-4 are the unpigmented polyurethane coating compositions as taught by the present invention to produce chip-resistant pigmented coatings. The tensile strength and percent elongation at break values given for the unpigmented compositions are determined as described hereinafter in the portion of the specification which describes other test procedures.

"Polyisocyanate A" means 75% nonvolatile solids solution in xylol of aliphatic moisture-curing polyurethane having an NCO content of 6% based on total weight, an equivalent weight of about 700 sold under the trade designation "DV 2469" by the Spencer Kellogg Division of Textron, Inc.

"Polyisocyanate B" means aliphatic isocyanate prepolymer sold as a 60% solids solution in xylol ethyl glycol acetate sold under the trade designation "Spenlite" P99-CX 60 by the Spencer Kellogg Division of Textron, Inc.

"Polyisocyanate C" means aliphatic polyisocyanate dissolved in ethyl glycol acetate and xylene (1:1) having an NCO content of about 16%, a solids content of about 75%, equivalent weight of about 255 and a specific gravity at 20° C. of about 1.07 sold under the trade designation "Desmodur N 75" by the Mobay Chemical Company.

"Polyisocyanate D" means polyisocyanate based on cycloaliphatic isophorone diisocyanate containing isocyanate groups and having a functionality of between 3 and 4 sold under the trade designation IPDI "T-1890 S" by Chemische Werke Hüls Ag.

EXAMPLES 1-4

| Ex. | PART A Parts | Ingredients | PART B Parts | Ingredients | NCO:OH Ratio | Solids | Tensile psi | Elongation |
|---|---|---|---|---|---|---|---|---|
| 1 | 32.1 | polyol | 63.5 | polyisocyanate A | 1.1:1 | 50% | 3570 | 190% |
|  | 44.0 | flow control agent | 24.90 | methyl ethyl ketone solvent |  |  |  |  |
|  | 27.1 | methyl ethyl ketone solvent |  |  |  |  |  |  |
|  | 0.32 | catalyst |  |  |  |  |  |  |
|  | 0.32 | antifoam agent |  |  |  |  |  |  |
| 2 | same as Example 1 |  | 92.4 | polyisocyanate B | 1.1:1 | 40% | 2330 | 100% |
|  |  |  | 53.4 | lacquer thinner |  |  |  |  |
| 3 | same as Example 1 |  | 30.9 | polyisocyanate C | 1.1:1 | 40% | 600 | 85% |
|  |  |  | 31.1 | lacquer thinner |  |  |  |  |
| 4 | same as Example 1 |  | 42.4 | polyisocyanate D | 1.1:1 | 40% | 2577 | 85% |
|  |  |  | 36.9 | lacquer thinner |  |  |  |  |

IDENTIFICATION OF INGREDIENTS

"Polyol" means 100% solids polyester polyol having an average molecular weight of 1180, a functionality of 3.5, a hydroxyl equivalent weight of 321, and a hydroxyl value of 175, being sold under the trade designation "1955" by the Spencer Kellogg Division of Textron, Inc.

"Flow Control Agent" means a 25% nonvolatile solids solution of cellulose acetate butyrate and equal parts of methyl ethyl ketone and toluene, the solids being sold by Eastman Chemical Co. under the trade designation "CAB 551-0.2".

"Catalyst" means 10% nonvolatile solids dibutyltindilaurate in ethyl glycol acetate.

"Lacquer Thinner" means liquid hydrocarbon mixture sold under the trade designation "DuPont" 3661S.

The actual blends of ingredients are described hereinafter in Table IV.

The control examples described below are conventional chip-resistant commercially available coating compositions or primers which are provided for purposes of comparison with the compositions according to the method of the present invention.

IDENTIFICATION OF CONTROL EXAMPLES

| Designation | Source | Tensile | Elongation |
|---|---|---|---|
| "Imron" | Registered trademark of the DuPont Company for an unpigmented chip-resistant polyurethane clear enamel | 2100 psi | 18% |
| "R-M" acrylic enamel | Clear acrylic enamel available from Rinshed-Mason Division of Inmot Corp. comprised of acrylic urethane | 5420 psi | 8% |
| "Gravel Guard" | Trade designation of a vinyl paint composition available from the Acme Paint Company | too brittle to measure | too brittle to measure |
| Original finish | Chrysler and Ford acrylic enamel and General Motors acrylic lacquer |  |  |

The testing procedures, including a pencil hardness test, a Gardner Impact Test, a chipping test, a tensile strength test and an elongation test are described below. The test results are also reported in Table IV following the description of the test procedures.

TESTING

Pencil Hardness Test

The pencil hardness test is that identified as ASTM No. D3363 which involves determining the hardness of a coating in terms of drawing or pencil leads of known hardness. The coatings were allowed to cure at room temperature at least 10 days before testing. The test involves placing a coated rigid panel on a firm horizontal surface and firmly holding a series of lead pencils of varying hardness, starting with the hardest pencil and continuing to the softest, against the coated surface at a 45° angle, pointed away from the operator, and pushing away from the operator in a ¼ inch stroke. The test is continued until the pencil will not cut into or gouge the film. The pencils are draftsman's drawing or pencil leads of known hardness varying from 6B (the softest), 5B, 4B, 3B, 2B, B, HB, F, H, 2H, 3H, 4H, 5H to 6H (the hardest). An acceptable coating will have a pencil hardness in the range of HB to H.

Gardner Impact Test

The coatings were tested for failure under rapid deformation by impact using ASTM test method D-2794-69. The test involves permitting a cylindrical weight to strike a semi spherical steel contact head or indenter after falling through a steel tube approximately 24 to 48 inches in length. The tube is mounted vertically over a base plate constructed so that a thin flat panel may be inserted at least 2 inches under the tube with the indenter resting on the test panel directly above a 0.640 inch diameter cylindrical hole under the tube to receive the deformed portion of the test panel, after impact. Before testing, the thin flat 20 gauge (0.032 inch) steel panels previously coated with an original equipment manufacturer's (OEM) pigmented protective coating are lightly sanded and then coated with the compositions herein described. The coated samples are then stored at 77 ($\pm 1.5$)°F., and 55 ($\pm 5$)% relative humidity for at least 48 hours.

In the test, each test panel is placed in the apparatus with the coated side either up or down and the weight is raised to a height where it is expected that no failure will occur and released so that it drops on the indenter. The test panel is then removed from the apparatus and the impact area observed for cracks in the coating. If no crakcs are evident, the test is repeated at a greater height, increasing 1 inch at a time. Once the visible cracks are observed, a second panel should be indented in a similar manner, concentrating on smaller intervals of force around that at which the crack was first observed. Since cracks are difficult to see, even with magnification, they may be made more visible by use of an acidified copper sulfate solution consisting of 10 parts of $CuSO_4.5H_2O$ and 90 parts of 1 N hydrochloric acid. This solution should be kept in contact with the coated side of the impact area for at least 15 minutes. The impact results are determined by the largest number of inch pounds under which cracking does not occur. The values reported in the table indicate the inch pounds withstood by the coating without evidence of cracking with direct (D) contact on the coated surface or reverse (R) on the back side.

Chipping Test

The coatings were also tested for chip resistance using the chip resistance test described in the Society of Automotive Engineer's Technical Report J400. The test consists of projecting a standardized road gravel by means of a control air blast onto a suitable test panel. The testing apparatus is contained in a box on wheels, called a gravelometer, designed to contain road gravel, a test holder, and a gravel projecting mechanism. The gravel was water-worn gravel rather than crushed limestone or rock, which will pass through ⅝ inch screen when graded, but be retained on ⅜ inch screen. The projecting mechanism, located in the front of the test panel, consists of an air nozzle in the base of a pipe T. The stem of the pipe T points upward and is connected to a funnel into which the gravel is poured. The gravel, falling into the air blast, is projected toward and impacts upon the test panel, which is usually held perpendicular to the impinging gravel. All testing is conducted at room temperature. After gravel impact, masking tape is applied to remove any loose chips remaining on the panel, and the degree of chipping is determined by counting the number and size of all chips.

The test panel is the same as that described hereinbefore in the description of the Gardner Impact Test which has been coated with the test coating and permitted to dry and age for a minimum of 72 hours at room temperature before testing. The test panels are conditioned for a minimum of one hour at the specified test temperature prior to testing. In the test, one pint of gravel is applied over a 5 to 10 second period of time employing an air pressure of about 70 psi as the propelling means.

The number of chips is a numerical rating selected from the range of 0 to 10 as described in Table 1 to indicate the number of chips in a 4 inch square area.

TABLE I

| Rating Number | Number of Chips |
|---|---|
| 10 | 0 |
| 9 | 1 |
| 8 | 2–4 |
| 7 | 5–9 |
| 6 | 10–24 |
| 5 | 25–49 |
| 4 | 50–74 |
| 3 | 75–99 |
| 2 | 100–149 |
| 1 | 150–250 |
| 0 | >250 |

The size of the chips are rated A through D, according to the table set out below:

TABLE II

| Rating Letter | | |
|---|---|---|
| A | <1 mm 1 | (< approximately 0.03 in.) |
| B | 1.3 mm | (approximately 0.03 . 0.12 in.) |
| C | 3.6 mm | (approximately 0.12 . 0.25 in.) |
| D | >6 mm | (> approximately 0.25 in.) |

The third item designated with respect to the Gardner Impact Test is the point of failure notation, that being a number from 0 to 4, as described in the table below.

TABLE III

| | POINT OF FAILURE NOTATION | |
|---|---|---|
| Notation | Level of Failure | Type of Fail |
| 0 | No fail | |
| 1 | Impact coat - surface scuff | cohesive |
| 2 | Impact coat to OEM finish | adhesive |
| 3 | OEM top coat to primer and into primer | cohesive |
| 4 | Primer to substrate | adhesive |

Thus the most desirable chipping test rating is 10-A-0 and the least desirable is 0-D-4. It should be noted that more than one result in each category is possible, as indicated in Table IV.

Tensile Strength

The tensile strength is determined by stretching a test sample of the coating in a Scott CRE 500 tensilometer until the sample achieves its maximum tensile strength prior to breaking. The tensile strength is measured in pounds per square inch.

Elongation

The percent elongation is also determined by using the Scott tensilometer. The test involves measuring the initial length of a test sample and its length after stretching to maximum tensile strength and dividing the stretched length by the initial length and multiplying the result by 100.

TABLE IV

| PIGMENTED COATING COMPOSITION | | COATING | | | | CHIP RATING | | |
|---|---|---|---|---|---|---|---|---|
| Polyurethane | Volume | THICKNESS | Pencil | GARDNER IMPACT | | | | Point of |
| Coating | Ratio | (mils) | Hardness | D | R | No. | Size | Failure |
| Ex. 1 | 1:1 | 7 | F | 160 | 160 | 5 | A | 1 |
| Ex. 2 | 1:1 | 7 | H | 160 | 160 | 3 | A | 1 |
|  |  |  |  |  |  | 6 | B | 2 |
| Ex. 3 | 1:1 | 9 | HB | 160 | 160 | 6 | A | 1 |
|  |  |  |  |  |  | 6 | A | 2 |
| Ex. 4 | 1:1 | 7 | H | 40 | 10 | 3 | A | 1 |
|  |  |  |  |  |  | 7 | A | 2 |
| "Imron" |  | 4 | H | 20 | 10 | 6 | B | 3 |
|  |  |  |  |  |  | 7 | C | 3 |
| "R-M" acrylic enamel |  | 3 | 2H | 50 | 10 | 5 | B | 3 |
| "Gravel Guard"[1] |  | 9 | 3H | 20 | 10 | 7 | B | 2 |
|  |  |  |  |  |  | 9 | B | 3 |
| OEM Control |  | 4 | 3H–4H | 50 | 10 | 3 | A | 3 |

[1]To simulate product manufacturer's suggested use, used over a refinish primer on phosphated, 20 gauge cold rolled steel panel which was then coated with a refinish pigmented protective coating.

Examples 1–4 exhibited the same test results whether blended with pigmented acrylic enamel or lacquer. All blends taught by the present invention exhibited pencil hardnesses in the range of HB to H, indicating a moderately soft coating as compared to conventional automotive finishes. Applicant has found that protective finishes having a hardness falling within such a range provide optimum chip resistance. The Gardner Impact Test confirms this fact, indicating test results of 40 or above (both with direct impact and reverse impact). The test most related to actual road gravel exposure is the chip rating test which clearly confirms the superior chip resistance of the compositions applied according to the method of the present invention.

Coatings are virtually as smooth and glossy as OEM and refinish protective coatings.

In actual tests on several motor vehicles, each coated on one vehicle side, either left or right, over chip-prone areas, after more than 30,000 miles, the sides coated according to the method of the present invention have no visible chipping while the uncoated sides sustained severe chipping, especially at the leading edges.

It should also be noted that compositions applied according to the method of the present invention produce coatings which function well throughout temperature fluctuations and which are resistant to liquid hydrocarbons such as anti-freeze, gasoline, road tar and motor oil, detergents, weathering and aging.

What is claimed is:

1. Method of applying to a substrate a chip-resistant pigmented polyurethane protective coating particularly suited for matching existing pigmented protected surfaces on said substrate wherein said existing protected surface is provided by an acrylic lacquer, acrylic enamel or nitrocellulose lacquer containing the same pigmentation, said method comprising:
    (1) blending
        (a) liquid curable primary amine-free non-coloring polyurethane coating composition curable to form a polyurethane having an elongation at break of at least 75% and being formed of a catalyzed mixture of polyester polyol having more than one terminal hydroxyl group and an equivalent weight between 250 and 1500, sufficient polyisocyanate compound characterized by having at least two terminal isocyanate groups each attached to a non-benzenoid carbon to provide an NCO:OH ratio of about 2:1 to about 0.8:1, and compatible organic solvent to make a solids content about 20% to 70% by weight and a vicosity of about 20 to 300 cps as determined using a Brookfield RVF viscometer at 25° C. using a No. 1 spindle at 20 rpm; and
        (b) liquid pigmented protective coating composition selected from the group consisting of acrylic lacquer, acrylic enamel and nitrocellulose lacquer reduced with compatible solvent for use in a wet volume ratio of pigmented protective coating composition to polyurethane coating composition of about 2:1 to 1:20;
    (2) applying at least one coating of the resultant blend to said surface to provide a uniform dry coating thickness of from about 1 to 20 mils; and
    (3) permitting said coating to dry.

2. The method of claim 1 wherein there is initially coated on the surface of said substrate at least one unpigmented coating of said polyurethane coating composition.

3. The method of claim 1 wherein said substrate is coated initially with a primer.

4. Method of applying to a substrate a chip-resistant pigmented polyurethane protective coating particularly suited for matching existing pigmented surfaces on said substrate wherein said existing protected surface is provided by an acrylic lacquer, acrylic enamel or nitrocellulose lacquer containing the same pigmentation, said method comprising:
    (1) applying to said substrate at least three uniform coats comprising an unpigmented liquid curable primary amine-free nondiscoloring polyurethane coating composition curable to form a polyurethane having an elongation at break of at least 75% and being formed of a catalyzed mixture of polyester polyol having more than one terminal hydroxyl group and an equivalent weight between 250 and 1500, sufficient polyisocyanate compound characterized by having at least two terminal isocyanate groups each attached to a non-benzenoid carbon to provide an NCO:OH ratio of about 2:1 to about 0.8:1, and compatible organic solvent to make a solids content about 20% to 70% by weight and a viscosity of about 20 to 300 cps as determined using a Brookfield RVF viscometer at 25° C. using a No. 1 spindle at 20 rpm;

(2) permitting said organic solvent to flash evaporate to provide a coating having a tacky surface condition between coats;

(3) applying sufficient uniform coats of a blend of said unpigmented polyurethane coating composition and a liquid pigmented protective coating composition selected from the group consisting of acrylic lacquer, acrylic enamel and nitrocellulose lacquer reduced with compatible solvent for use in a wet volume ratio of pigmented protective coating composition to polyurethane coating composition of about 2:1 to 1:20 to provide a uniform dry coating thickness of from about 1 to 20 mils; and (4) permitting said coats to dry.

* * * * *